United States Patent
Moriya

(10) Patent No.: US 10,357,022 B2
(45) Date of Patent: Jul. 23, 2019

(54) SYSTEM AND METHOD FOR ANIMAL CONTROL

(71) Applicant: siOnet Ltd., Ramat Hasharon (IL)

(72) Inventor: Netzer Moriya, Ramat Hasharon (IL)

(73) Assignee: siOnet Ltd., Ramat Hasharon (IL)

( * ) Notice: Subject to any disclaimer, the term of this patent is extended or adjusted under 35 U.S.C. 154(b) by 251 days.

(21) Appl. No.: 15/107,471

(22) PCT Filed: Oct. 26, 2015

(86) PCT No.: PCT/IL2015/051046
§ 371 (c)(1),
(2) Date: Jun. 23, 2016

(87) PCT Pub. No.: WO2017/072749
PCT Pub. Date: May 4, 2017

(65) Prior Publication Data
US 2017/0258042 A1    Sep. 14, 2017

(51) Int. Cl.
*A01K 15/02* (2006.01)

(52) U.S. Cl.
CPC .......... *A01K 15/021* (2013.01); *A01K 15/029* (2013.01)

(58) Field of Classification Search
CPC ... A01K 15/021; A01K 15/029; A01K 27/009
See application file for complete search history.

(56) References Cited

U.S. PATENT DOCUMENTS

| | | | |
|---|---|---|---|
| 6,431,122 B1 * | 8/2002 | Westrick | |
| 8,934,923 B1 * | 1/2015 | Golden | A01K 11/008 455/426.1 |
| 2006/0011145 A1 * | 1/2006 | Kates | A01K 15/02 119/719 |
| 2007/0289554 A1 * | 12/2007 | Moore | A01K 15/021 119/721 |
| 2008/0036610 A1 * | 2/2008 | Hokuf | A01K 11/008 340/573.3 |
| 2008/0180256 A1 * | 7/2008 | Caldwell | |
| 2011/0298615 A1 * | 12/2011 | Rich | A01K 15/023 340/539.13 |
| 2014/0230755 A1 * | 8/2014 | Trenkle | A01K 27/009 119/859 |
| 2014/0251233 A1 * | 9/2014 | Bianchi | A01K 15/021 119/720 |

* cited by examiner

*Primary Examiner* — Monica L Williams
(74) *Attorney, Agent, or Firm* — Manelli Selter PLLC; Edward J. Stemberger

(57) ABSTRACT

Described is system to modify and prevent the destructive behavior of household animals. The system includes two units. One unit is attached to the animal and the second unit is used as a control unit. The animal behavior modification is applied according to the distance between the units and the animal behavior.

15 Claims, 4 Drawing Sheets

SYSTEM AND METHOD FOR ANIMAL CONTROL

The present application claims priority to Patent Cooperation Treaty application PCT/IL2015/051046 filed Oct. 26, 2015.

TECHNOLOGY FIELD

The present system and method relate to the field of animal control and in particular to systems for modifying an animal's behavior and to stop the destructive behavior of household pets.

BACKGROUND

Household pets can engage in many types of destructive behavior where examples can include; cats tend to claw at furniture; dogs chew household items; dogs dig up the garden; dogs or cats run away from the house or garden. To prevent unwanted behavior household pets are trained in an attempt to modify or reduce their destructive behavior. Examples in the art include various systems which emit an audio signal to alert the animal to a wrongful action and prevent its occurrence. One examples of an audio system is a dog collar with an embedded audio controller which emits a loud sound. The audio controller can be controlled by the dog owner or trainer or alternatively by an automated system, which receives the dog location and emits a sound based on the location. In another example the dog collar may induce electric stimuli to alert the animal to the unwanted behavior. In another example a fence or other object may include an audio emitting device which is triggered by the animal touching the fence or object. In another example the fence can induce an electric stimuli to alert the animal.

Existing art suffers from the following limitations;

Requires either active human control or a central system with a monitoring of animal location Requires extensive infrastructure as the case of fences Hence an alternative system and method which does not have these limitations is required.

DESCRIPTION OF AN EXEMPLARY EMBODIMENT

Figure 1:
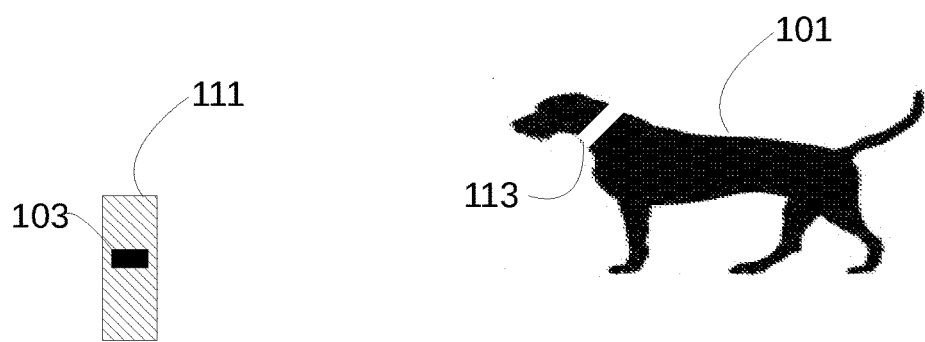
FIG. 1 is an example of a system for preventing unwanted animal behavior.
Figure 2A:
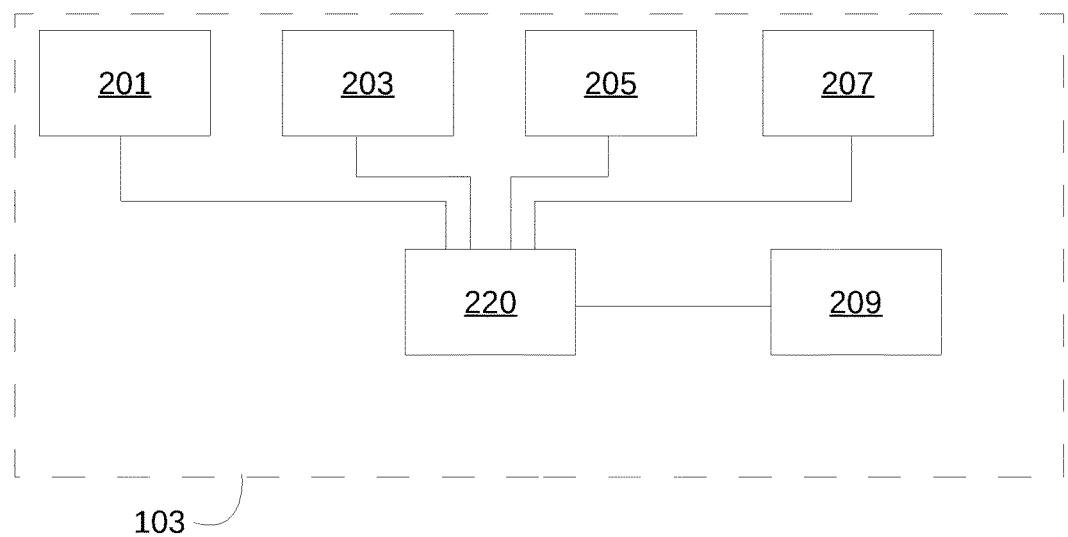
FIG. 2A is an example of an active prevention unit.

This document describes a system and method for preventing unwanted animal behavior and which overcomes the deficiencies of existing solutions. FIG. 1 is an example of a system for preventing unwanted animal behavior. In one example the system is composed of at least two units. An active prevention unit (103) is attached to an object (111). Examples of an object (111) can include fence posts, sprinklers, furniture items, toys, and gates. The animal alert unit (113) is attached to the animal. Examples of attachment can include dog or cat collars, animal clothing items, under skin modules and ear clips. FIG. 2A is an example of an active prevention unit (103). In one example the active prevention unit (103) comprises of; a central processing module (220); a power module (201); memory module (203); motion detection module (205); an input/output module (209); and a communication module (207). The central processing module (220) includes a CPU that controls the operation of the active prevention unit (103) and other modules of the system. In one example the active prevention unit (103) has two modes of operation. In the first mode certain parameters are input to the unit. The parameters can be input via the input/output module (209) or through the communication module (207). Examples of parameters can include range of motion which can cause an activation of the active prevention unit (103), duration of activation, etc. In one example such parameters are predefined and stored in the memory module (203). Examples of communication modules (207) include; RF communication modules such as Wi-Fi, ZigBee, DECT, Bluetooth, or proprietary protocols; near field communication modules such as NFC; acoustic or ultrasound communication modules. In one example the motion detection module (205) is comprised of an accelerometer. In another example the motion detection module (205) is comprised of a 3 axis accelerometer. In another example the motion detection module (205) is comprised of a 3 axis accelerometer and a 3 axis gyro. In a further example the motion detection module (205) can also include a tilt sensor, and/or a magnetic sensor.

Figure 2B:
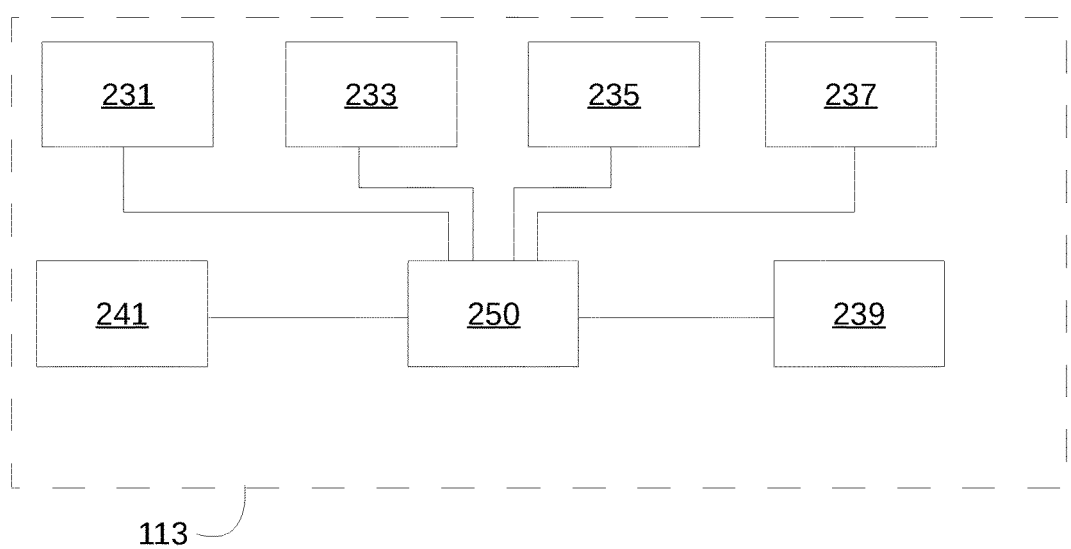
FIG. 2B is an example of an animal alert unit.

FIG. 2B is an example of an animal alert unit (113). In one example the animal alert unit (113) comprises of; a central processing module (250); a power module (231); memory module (233); motion detection module (235); an input/output module (239); a communication module (237); and an acoustic transducer (241). The central processing module (220) controls the operation of the animal alert unit (113) and other modules in the animal alert unit (113). In one example the animal alert unit (113) has two modes of operation. In the first mode certain parameters are input to the unit. The parameters can be input via the input/output module (239) or through the communication module (237). Examples of parameters can include duration of alert activation, mode of alert, etc. In one example such parameters are predefined and stored in the memory module (233). Examples of communication modules (237) include; RF communication modules such as Wi-Fi, ZigBee, DECT, Bluetooth, or proprietary protocols; near field communication modules such as NFC; acoustic or ultrasound communication modules. In one example the motion detection module (235) is comprised of an accelerometer. In another example the motion detection module (235) is comprised of a 3 axis accelerometer. In another example the motion detection module (235) is comprised of a 3 axis accelerometer and a 3 axis gyro. In a further example the motion detection module (235) can also include a tilt sensor, and/or a magnetic sensor.

In one example the operation of the system is as follows; an animal alert unit (113 in FIG. 1) is attached as defined above, to the animal (101 in FIG. 1) to be monitored and activated via input/output module (239 in FIG. 2B). The active prevention unit (103 in FIG. 1) is attached to objects (111 in FIG. 1) as defined above and activated via input/output module (209 in FIG. 2A). In one example the active prevention unit is configured to emit a signal via the communication module when the motion detection unit (205) measures a motion exceeding the predefined threshold. In one example, the animal (101 in FIG. 1) causes the object (111 in FIG. 1) to move by touching the object (111 in FIG. 1) or its vicinity. In another example the animal (101 in FIG.

1) causes the object (111 in FIG. 1) to move by digging, running or walking near the object. In this example the motion is felt as seismic or acoustic vibrations by the accelerometers in the motion detection unit (205 in FIG. 2A). The emitted signal is received by the communication unit (237 in FIG. 2B) of the animal alert unit (113 in FIG. 2B). The received signal is processed by the central processor module (231 in FIG. 2B) and activates the acoustic transducer (241 in FIG. 2B) to emit an acoustic signal. In one example the acoustic signal is an audio signal. In another example the acoustic signal is an ultrasonic signal in a range suitable for the hearing range of the animal (101 in FIG. 1). In another example the active component is embedded with a vibration actuator (in low frequency range if few tens of Hz), for example a device for a dog can emit at 20-40 KHz. The acoustic signal is designed to alert the animal with a peak power of 80, 90 or even 100 and up to 140 dB SPL. In one example the acoustic signal is intermittent. In a further example the on/off ratio of the signal can be in the range of 10-100%. In another example the acoustic transducer (241 in FIG. 2B) is replaced with an electrical stimulation device which creates a minor electrical stimulus to alert the animal.

Figure 3:
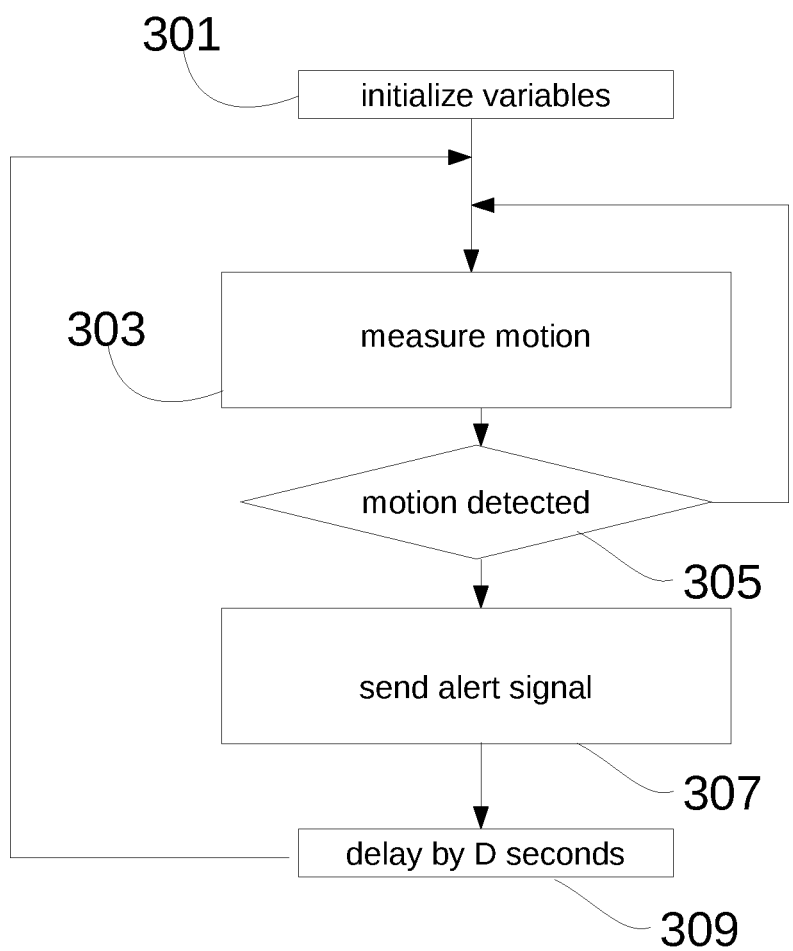
FIG. 3 is an example of an algorithm which is executed by the active prevention unit.

FIG. 3 is an example of an algorithm which is executed by the active prevention unit (103 in FIG. 2A). In block (301) the variables are initialized. In one example the values can be obtained from the memory module (203 in FIG. 2A). In another example the values can be provided through the input/output module (209 in FIG. 2A). Examples of values include; delay time; threshold of motion; animal ID parameters. In block (303) the motion detection module (205 in FIG. 2A) measures the motion of the animal. In one example block (305) compares the motion measured in block (303) to a threshold value. In another example block (305) can measure various traits of the motion to determine if a prescribed motion has occurred. Examples of motion traits include; correlation in two or more axis; temporal motion features; spectral motion features; recurrence of temporal or spectral motion features. If block (305) determines a motion has occurred execution will transfer to block (307) which sends an alert signal via communication module (207 in FIG. 2A). Block (309) defines a delay after the alert signal has occurred. After the delay, block (303) is executed and the motion is measured. If block (305) determines no motion has occurred than the next block to be executed is block (303) where the motion is measured again.

Figure 4:
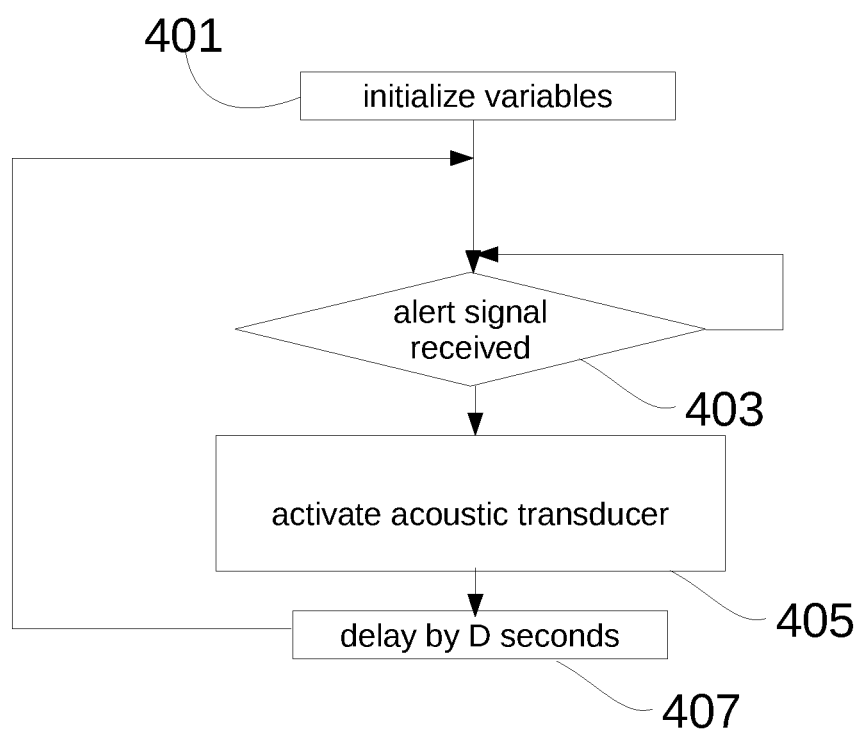
FIG. 4 is an example of an algorithm which is executed by the animal alert unit.

FIG. 4 is an example of an algorithm which is executed by the animal alert unit (113 in FIG. 2B). In block (401) the variables are initialized. In one example the values can be obtained from the memory module (233 in FIG. 2B). In another example the values can be provided through the input/output module (239 in FIG. 2B). Examples of values include; delay time; threshold of motion; animal ID parameters. In block (403) the communication module (237 in FIG. 2B) is queried. The algorithm executes block (403) until an alert signal has been received by the communication module (237 in FIG. 2B). After the alert signal has been received, block (405) is executed and the acoustic transducer (241 in FIG. 2B) emits an acoustic signal. Examples of acoustic signals include audio signals, ultrasound signals, recurring acoustic signals such as sirens. In another example, when the acoustic transducer is replaced with an electrical stimulation unit the emitted signal may be an electrical stimulation. Block (407) defines a delay after the alert signal has occurred. After the delay, block (403) is executed until a new alert signal is received.

In another example, the communication unit (237 in FIG. 2B) of the animal alert unit (113 in FIG. 2B) emits a signal. The communication unit (207 in FIG. 2A) of the active prevention unit (103 in FIG. 2A) emits a response to the signal which is received by the communication unit (237 in FIG. 2B) of the animal alert unit (113 in FIG. 2B). By analyzing the time delay of the response and accounting for any internal system latencies the central processing unit (231 in FIG. 2B) of the animal alert unit (113 in FIG. 2B) can calculate the distance of the animal (101 in FIG. 1) from the object (111 in FIG. 1). In one example, the animal alert signal is activated when the distance is smaller than a predefined threshold. In another example the animal signal is activated when the distance is greater than a predefined threshold. One example of a predefined threshold for the distance is 10 meters. Another examples of a predefined threshold for the distance is 50 meters. In another example the animal alert signal is triggered when the change in distance is greater than a predefined threshold. These examples describe situations where the animal (101 in FIG. 1) activity may be limited to a certain area, or where the animal (101 in FIG. 1) is not allowed to enter a certain area or to alert in case the animal (101 in FIG. 1) is running away from an area.

To sum in one example we describe a system and method for controlling the behavior of animals comprising of; an animal alert unit (113 in FIG. 1) which includes a communication module (237 in FIG. 2B) configured to receive a communication signal; an active prevention unit (103 in FIG. 1) which includes a communication module (207 in FIG. 2A) capable of transmitting a communication signal and a motion detection module (205 in FIG. 2A); wherein the active prevention unit (103 in FIG. 1) transmits a communication signal and the animal alert unit (113 in FIG. 1) receives said communication signal; wherein said communication signal is transmitted when a motion has been detected by the motion detection module (205 in FIG. 2A). In further example the animal alert unit (113 in FIG. 1) includes an acoustic transducer (241 in FIG. 2B) and said acoustic transducer (241 in FIG. 2B) is activated to emit an acoustic signal when a communication signal has been received by the communication module (237 in FIG. 2B) of the animal alert unit (113 in FIG. 1). In another example the motion that has been detected by the motion detector module (205 in FIG. 2A) is a predefined temporal signal such as a sawtooth signal. In another example the motion that has been detected by the motion detector module (205 in FIG. 2A) is a predefined spectral signal. One example of a predefined spectral signal is a series of low and high frequencies segments that last different short periods of times. In a further example the motion that has been detected by the motion detector module (205 in FIG. 2A) is a predefined recurring signal. In one example the recurring signal is composed of a set of signals with short periods of silence between each signal.

In another example the animal alert unit includes an electrical stimulation module and said electrical stimulation module is activated to emit electrical stimuli when a communication signal has been received by the communication module (237 in FIG. 2B) of the animal alert unit (113 in FIG. 1).

In another example described is a method for controlling the behavior of animals comprising; Providing an animal alert unit (113 in FIG. 1) including a communication module (237 in FIG. 2B) configured to receive a communication signal; Providing an active prevention unit (103 in FIG. 1) which includes a communication module (207 in FIG. 2A)

capable of transmitting a communication signal and a motion detection module (205 in FIG. 2A); wherein the active prevention unit (103 in FIG. 1) transmits a communication signal and the animal alert unit (1013 in FIG. 1) receives said communication signal; and wherein said communication signal is transmitted when an animal motion has been detected by the motion detection module (205 in FIG. 2A).

The described system and algorithm expands on the state of art and resolves the deficiencies of existing solutions namely; the proposed system does not requires active human control or a central system with a monitoring of animal location; and the proposed system does not require extensive infrastructure as the case of fences It is clear that in the implementation of the apparatus and method, many modifications could be made to the system that carries out the described algorithm. It should be considered that all modifications and alterations of the system and algorithm are falling within the scope of this document.

What is claimed is:

1. A system for controlling the behavior of animals comprising:
    an animal alert unit configured to be coupled to an animal and including a communication module configured to transmit and receive a communication signal;
    an active prevention unit configured to be coupled to an object and which includes a communication module capable of receiving and transmitting a communication signal, and a motion detection module;
    wherein the active prevention unit and animal alert unit are in communication to determine the animal distance from the active prevention unit;
    wherein the active prevention unit transmits a communication signal and the animal alert unit receives said communication signal; and
    wherein said communication signal is transmitted when the animal distance from the active prevention unit is different from a predefined distance and when motion of the object to which the active prevention unit is coupled has been detected by the motion detection module.

2. The system of claim 1 wherein the animal alert unit includes an acoustic transducer and said acoustic transducer is activated to emit an acoustic signal when a communication signal has been received by the communication module of the animal alert unit.

3. The system of claim 2 wherein the motion that has been detected by the motion detector unit is a predefined temporal signal.

4. The system of claim 2 wherein the motion that has been detected by the motion detector unit is a predefined spectral signal.

5. The system of claim 2 wherein the motion that has been detected by the motion detector unit is a predefined recurring signal.

6. The system of claim 1 wherein the animal alert unit includes an electrical stimulation module and said electrical stimulator is activated to emit an electrical stimuli when a communication signal has been received by the communication module of the animal alert unit.

7. The system of claim 1 wherein said communication signal is transmitted when the animal distance from the active prevention unit is less than the predefined distance.

8. The system of claim 1 wherein the animal alert unit further comprises a central processing module constructed and arranged to calculate the animal distance from the active prevention unit by analyzing a time delay between a signal sent by the animal alert unit to the active prevention unit and a response signal sent from the active prevention unit and received by the animal alert unit.

9. A method for controlling the behavior of animals comprising:
    coupling an animal alert unit to an animal, the animal alert unit including a communication module configured to transmit and receive a communication signal;
    coupling an active prevention unit to an object, the active prevention unit includes a communication module capable of transmitting and receiving a communication signal, and a motion detection module;
    wherein the active prevention unit and animal alert unit are in communication to determine the animal distance from the active prevention unit;
    wherein the active prevention unit transmits a communication signal and the animal alert unit receives said communication signal; and
    wherein said communication signal is transmitted when the animal distance from the active prevention unit is different from a predefined distance and when motion of the object to which the active prevention unit is coupled has been detected by the motion detection module.

10. The method of claim 9 wherein the animal alert unit includes a vibration actuator and said vibration actuator is activated to emit an acoustic signal when a communication signal has been received by the communication module of the animal alert unit.

11. The method of claim 9 wherein the motion that has been detected by the motion detector unit is a predefined temporal signal.

12. The method of claim 9 wherein the motion that has been detected by the motion detector unit is a predefined spectral signal.

13. The method of claim 9 wherein the motion that has been detected by the motion detector unit is a predefined recurring signal.

14. The method of claim 9 wherein said communication signal is transmitted when the animal distance from the active prevention unit is less than the predefined distance.

15. The method of claim 9 further comprising:
    calculating the animal distance from the active prevention unit by analyzing a time delay between a signal sent by the animal alert unit to the active prevention unit and a response signal sent from the active prevention unit and received by the animal alert unit.

* * * * *